United States Patent
Gazit

(10) Patent No.: US 7,139,241 B1
(45) Date of Patent: Nov. 21, 2006

(54) METHOD FOR PREVENTING BUFFER UNDERFLOW DURING DIGITAL TRANSPORT STREAM TRANSMISSION, MULTIPLEXING AND SPLICING

(75) Inventor: Hillel Gazit, Palo Alto, CA (US)

(73) Assignee: Optibase Ltd., Herzelia (IL)

( * ) Notice: Subject to any disclaimer, the term of this patent is extended or adjusted under 35 U.S.C. 154(b) by 0 days.

(21) Appl. No.: 09/295,676

(22) Filed: Apr. 21, 1999

Related U.S. Application Data

(60) Provisional application No. 60/100,248, filed on Sep. 14, 1998.

(51) Int. Cl.
*H04L 12/28* (2006.01)
*H04J 1/16* (2006.01)

(52) U.S. Cl. .................................. 370/231; 370/412

(58) Field of Classification Search ........... 370/395.64, 370/230, 231, 232, 389, 395.1, 395.6, 412; 348/419.1, 423.1, 845; 709/231; 375/240, 375/240.1
See application file for complete search history.

(56) References Cited

U.S. PATENT DOCUMENTS

| | | | | |
|---|---|---|---|---|
| 5,874,997 A | * | 2/1999 | Haigh | 348/515 |
| 5,894,328 A | * | 4/1999 | Negishi | 348/462 |
| 5,913,031 A | * | 6/1999 | Blanchard | 348/512 |
| 5,917,830 A | * | 6/1999 | Chen et al. | 348/473 |
| 6,038,000 A | * | 3/2000 | Hurst, Jr. | 348/705 |
| 6,154,496 A | * | 11/2000 | Radha | 375/240.28 |
| 6,195,368 B1 | * | 2/2001 | Gratacap | 370/412 |
| 6,208,691 B1 | * | 3/2001 | Balakrishnan et al. | 348/700 |
| 6,233,253 B1 | * | 5/2001 | Settle et al. | 370/474 |

OTHER PUBLICATIONS

Sarginson, P. A. "MPEG-2: A Tutorial Introduction to the Systems Layer". IEEE 1995.*

* cited by examiner

*Primary Examiner*—Derrick Ferris
(74) *Attorney, Agent, or Firm*—Pearl Cohen Zedek Latzer, LLP

(57) ABSTRACT

A method for splicing MPEG-2 encoded transport streams to prevent decoder buffer underflow. Emulation of the transport stream prior to transmission determines whether a decoder underflow would occur after a splice proposed at a predetermined time. When a potential underflow is determined for a decoder buffer, null packets are deleted prior to the time proposed for transmission for the splice, and an earlier splice time is recomputed. A time delay is added to presentation time stamp and the decoding time stamp. A relationship between the respective components involved is described to calculate the null packets to be deleted as well as to calculate the time delay to be added to a presentation time stamp and to a decoding time stamp, whereby decoder buffer underflow is prevented.

1 Claim, 3 Drawing Sheets

METHOD FOR PREVENTING BUFFER UNDERFLOW DURING DIGITAL TRANSPORT STREAM TRANSMISSION, MULTIPLEXING AND SPLICING

REFERENCE

The information, data and all benefits of provisional application No. 60/100,248 filed Sep. 14, 1998 are incorporated by reference into this description.

The writing, the subject matter, and the description presented herein is protected under the provisions of United States Copyright laws by the Assignee, Viewgraphics, Inc., except only to any extent required by law in order to obtain and to continue all patent protection that is available during the term of any patent that issues hereon.

BACKGROUND OF THE INVENTION

Field of the Invention

The present invention relates generally to multimedia data stream processing and, more particularly, to apparatus and method for processing digitally encoded multimedia data streams.

Standards for encoding and decoding data streams having audio, video, and other multimedia and non-multimedia information, include the internationally adopted MPEG-1 (ISOIIEC 11172-n) and MPEG-2 (ISOIIEC 13818-n) specifications, as espoused by the Motion Picture Experts Group. MPEG-2 expands on MPEG-1 for broadcast-quality video and other applications.

Among other features, encoding/decoding specifications, such as MPEG-2, prescribe an array of data stream format, timing, synchronization, and device capability parameters that are essentially independent hardware/software system implementations. The MPEG-2 specification prescribes specific protocols and capabilities while allowing essentially unrestricted systems for implementing the prescribed protocols.

However, the MPEG-2 specification is deficient with regard to applications and contingencies unforeseen at the time the specification was first regarded as an industry standard. For example, it failed to anticipate the growing requirements for digitally-encoded data stream splicing support or how to recover from delays in receiving encoded data by a decoder.

Broadly stated, "digitally-encoded data stream splicing" involves appending a new data stream to a selected point in an existing data stream, thereby replacing the existing data stream at the splice point. Frames of a digitally encoded data stream are typically received by a decoder in a different order from their display. Decoders are required to buffer data streams so frames can be reconstructed and re-ordered.

A "MPEG-2 digitally-encoded data stream" is encoded such that, during decoding, a decoder buffer will continuously contain a sufficient number of frames for continuous decoding but not so many frames as to overflow the decoder buffer. The MPEG-2 encoded data stream consists of a limited number of frames (called "I frames") containing complete data for independently recreating an image.

Other frames, referred to as predicted frames ("P frames") and bi-directional frames ("B frames"), contain a lesser, variable amount of reference data for re-creating a video image by comparison with previously decoded frames. Such a data stream contains a variable amount of reference data for re-creating a video image. Over time, the buffer levels in a decoder will fluctuate depending on which frames and frame types have been transmitted to the buffer and which frames have been processed for display by the decoder.

MPEG-2 encoded data streams are carefully constructed to never exceed the bounds and limitations of the decoder's buffer. Decoders are constrained by the amount of memory that can be allocated for staging incoming frames of the data stream. Until each frame is prepared for display, frames transmitted to the decoder will occupy memory buffer space.

If the decoder cannot free up enough memory space in its buffers fast enough, a buffer overflow will occur. If the decoder is processing incoming frames faster than they are received, a buffer underflow will occur. A buffer overflow or underflow occurring in the decoder will compromise the display quality of the encoded data stream.

A high quality seamless splice of a MPEG-2 encoded data stream requires that the frames representing the new data stream must co-exist with frames of the previous data stream in the decoder's buffer. This must be done so that no buffer overflow or underflow occurs within the decoder's memory buffer.

If the buffer level maintained by the previous stream is not high enough, attempts to splice in a new stream can result in underflowing the decoder's buffer. Seamless splicing requires that no artificial data payload, such as black leader frames, are appended or pre-pended, "prefixed", to a data stream.

Splicing MPEG-2 encoded data streams is complicated further by the independent nature of each encoded data stream. In addition to the independent form and synchronization data associated with each data stream, conventional encoder and decoder specifications fail to provide requisite timing or splice point parameters.

Such difficulties are exacerbated further by the lack of data available for relating one stream to another. For example, no parameters are provided for determining, directly and reliably, the contents of a decoder buffer occupied by data from more than one stream.

Delays in transmission of valid MPEG-2 encoded data streams will increase the risk of underflowing a decoder's memory buffer. A delay can be introduced when the transmitter is multiplexing multiple MPEG-2 encoded data streams over a common communication transport interface.

In such a case, the transmitter may delay the packet from one stream in favor of another stream. As such, later data streams get de-multiplexed on the receiving side of the transport interface. Small delays can result, as packets representing the next video frame are collected into memory.

If this should happen while the decoder's buffer level is low, the decoder can fail to access the next required frame in time for continuous display of the data stream. For example, if this frame was a large "I" frame, any delay in receiving packets representing this large frame will cause the level of accessible frame data to drop, possibly causing the decoder to declare a buffer underflow.

Despite the above and other difficulties, solutions have been proposed. One solution is to decode the subject data streams, perform the splice in decoded form and, then, re-encode the data streams as a single data stream, all to effectively avoid the inherent problems of splicing or multiplexing encoded data streams.

Unfortunately, encoding and decoding hardware that is robust enough to perform the splice in real time would be very expensive. In broadcasting applications, each television channel is supplied by a separate data stream source, any one of which might well require splicing. Therefore, replacement of multiple encoders and decoders most likely would be required.

Standardization efforts proposed by the Society of Motion Pictures and Television suggest abandonment of current splicing methodologies in favor of new extension to the MPEG-2 specification. The proposal suggests a new integrated protocol directed specifically at performing seamless splicing of a data stream pair.

The proposed standard provides for incorporation of splice points and related splicing support information directly into the data stream at the time of encoding. Unfortunately, the proposed extensions will require the expense of replacing a very large number of existing encoders in production today. Also, they do not address the situation of drops in buffer levels occurring from delays in packet transmission.

Methods have been suggested recently for seamlessly splicing MPEG-2 digitally encoded data streams using the large installed base of encoders without requiring new encoding protocols. However, these methods are limited in not preserving the seam between two data streams when the original data stream has already caused the buffer level of the decoder to drop appreciably near the splice-out point. If the buffer level is too low in frames at the splice-out point, frames from the incoming splice-in point of the new data stream may cause the decoder's buffer to underflow.

As decoder memory buffer sizes are permitted to increase in the future, the benefit gained by maximizing buffer levels and by maximizing the number of frames accessible in the decoder buffer to avoid buffer underflows will increase also.

OBJECTS AND BRIEF SUMMARY OF THE INVENTION

A principal object of the present invention is to provide a method by which an underflow condition is avoided within a MPEG-2 decoder.

It is also an object of the method of the present invention to avoid an underflow condition either when seamlessly splicing two MPEG-2 encoded data streams or when delays occur in the transmission of packets of such data streams.

Briefly, according to a presently preferred aspect of the invention, the method of avoiding underflows is based on a technique for dynamically increasing decoder buffer levels before MPEG-2 encoded data streams are transmitted. This is achieved by determining first whether a decoder underflow could occur after a splice is performed with a buffer of predetermined size.

Other objects, features and advantages of the present invention will become more readily apparent from the following detailed description taken in conjunction with the accompanying drawings, a brief description of which follows.

DETAILED DESCRIPTION OF THE INVENTION

MPEG-2 encoded data streams contain two important time stamp fields. The presentation time stamp (PTS) is a field that may be present in a packet header to indicate the time that a portion of the data stream is to be presented in the system target decoder. The decoding time stamp (DTS) is a field to indicate when portions of the data stream are to be decoded in the target decoder.

Figure 1:
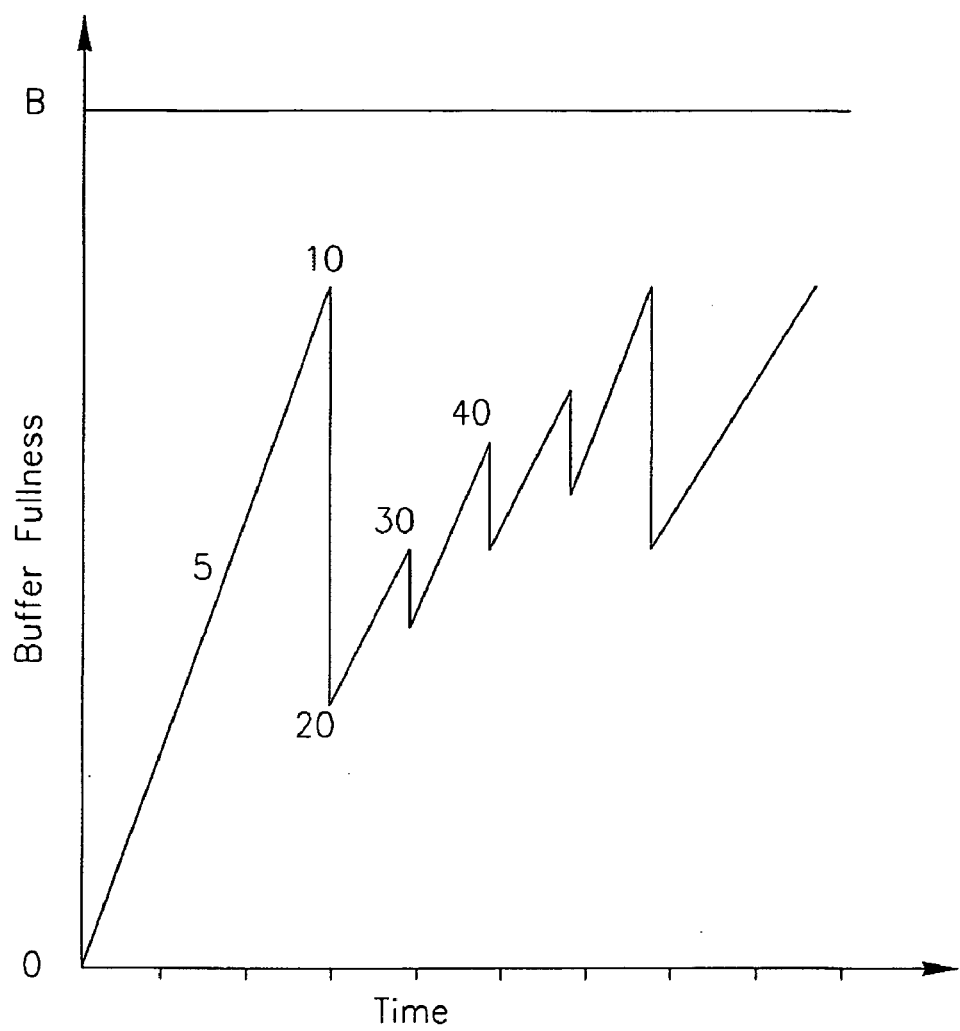
FIG. 1 is a timing diagram that illustrates a normal decoder's buffer occupancy over time of a sequence of frames from a MPEG-2 encoded data stream.

Referring now to FIG. 1, a normal decoder's buffer occupancy varies over time as a sequence of frames from a MPEG-2 encoded data stream is processed. The start up time, indicated by numeral 5, corresponds to an initial start up delay interval and to the interval during which frames start to fill a decoder's buffer. The decoding of a large frame, point 10, causes a drop to point 20 in the buffer level.

The receipt of smaller, auxiliary frames, such as predicted frames "P" or bi-directional frames "B" at later times, are indicated by points, such as points 30 and 40 in FIG. 1, causes the buffer level to increase.

Figure 2:
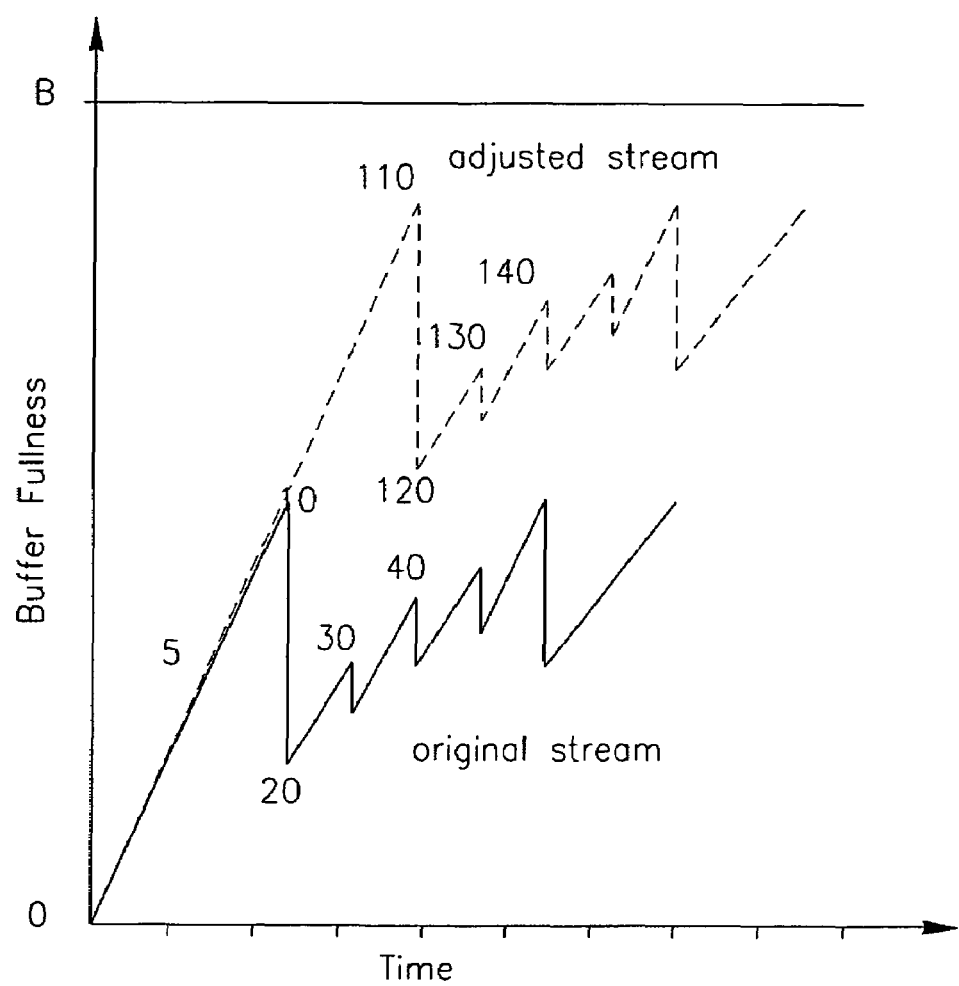
FIG. 2 is a timing diagram that illustrates the results of adjusting the time stamps of a MPEG-2 encoded data stream that can maintain a low buffer level within a decoder.

Referring next to FIG. 2 of the drawings, increasing the PTS and DTS, defined herein above, by a determined constant will affect corresponding higher buffer levels. By adding such a constant, the buffer level at time 10 is adjusted to a higher level 110, the buffer level at time 20 is adjusted to a higher level 120, the buffer level at time 30 is adjusted to a higher level 130, and so on. All the resulting buffer levels are higher.

To describe the invention in more detail, suppose the decoder buffer has a size B and that the current MPEG-2 encoded data stream is decoded for buffer size x, where x is less than B. The bit rate of the stream is S, the packets are uniformly of size P and each packet has a header of minimum size H.

For MPEG-2, packet size P is equal to 188 bytes and header size H is equal to four bytes. PTS and DTS of the current stream then are set to new values so as to fill up the decoder's buffer by B−x bytes. It has been discovered that adding a constant, T, to PTS and DTS does this, and according to the invention, T is predetermined as follows:

$$T=(B-x)/[S*(P-H)/P]$$

When this constant T is added to each DTS and PTS, the resulting data stream will have an artificially higher buffer level that will accommodate a splice point without underflowing the decoder buffer level. With today's decoder buffer sizes and most commercial MPEG-2 encoded data streams, this will delay the presentation of 20 the stream by as much as 100 milliseconds.

A seamless splice can underflow also when the original MPEG-2 encoded data stream contains normal size frames and normal buffer levels. However, there exists a dip in the buffer level close to an approaching splice out point.

Emulating the decoder's buffer level before the stream is transmitted to the decoder reveals this condition.

A reasonable rule for invoking this method of underflow prevention is when the factor (B−x) is less than 90% and there are fewer than four frames stored in the buffer.

Figure 3:
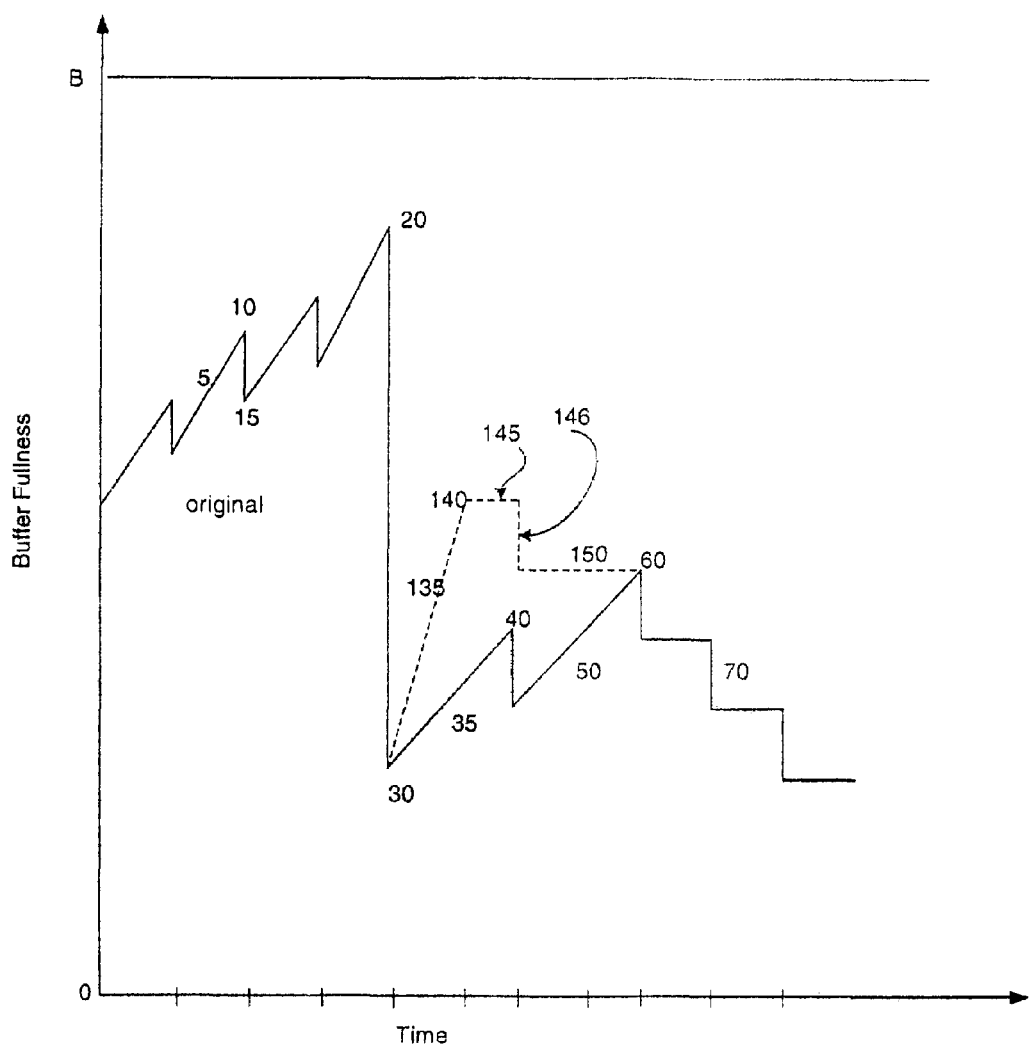
FIG. 3 is a timing diagram that illustrates the results of pre-pending null packets to an incoming data stream at the splice point to avoid buffer level underflow.

Referring next to FIG. 3 of the drawings, a seamless splice can produce a significant drop in buffer level of the original MPEG-2 encoded data stream. Various times T are adjusted, as indicated by points 5, 10, 15 and 20, correspond to incremental increases and decreases in the buffer level as new frames are received and decoded, prior to a desired splice point time 60.

A drop in buffer level occurs, point 70, until frames from the new stream become available to the decoder. Because the buffer level at the splice time, indicated by point 60, is already low, incoming frames from a new stream will likely not arrive in time, resulting in the decoder to underflow.

To avoid this condition, null packets are removed from the original MPEG-2 encoded data stream at a time, point 30, prior to the splice time, point 60. Removing null packets increases the buffer level quickly, as indicated by strong increasing trend 135.

By removing null packets after a time 30, instead of splicing at point 60, splice can now be earlier, at time 140, corresponding to a higher buffer level. The numeral 145 indicates an end time corresponding to the end of received transmission of the original stream. Last frame time 146 corresponds to the last frame in the original stream having been decoded.

At time 150, no new frame is available yet from the new stream. This gradual loss of buffer level can be continued until frames from the new stream have been received and are accessible by the decoding hardware, and they can start being received earlier (140).

The maximum number of packets to remove from the original stream is calculated as follows:

$$N=(B-x)/(P-H)$$

where:
  N=Number of packets;
  B=Decoding buffer size;
  x=Buffer size less than B;
  P=Packet size; and
  H=Minimum packet header size.

Accordingly, removing null packets from a stream that ordinarily would have maintained a low memory buffer level in a decoder has permitted earlier splicing in a subsequent stream. This avoids a potential buffer underflow.

The methods of the invention are implemented readily in a general purpose computer. For application to stored transport streams, most computers having adequate storage for the video can be used. For real time application to transport streams, the processor must be fast enough to keep up with the stream rates.

While the present invention has been described hereinabove in substantial detail, it is understood that various modifications, variations and changes can be made by one skilled in this art. Accordingly, the scope of the invention is intended to be defined by the appended claims.

What is claimed is:

1. A method for processing a digitally encoded multimedia stream of data that is in packets including processing prior to transmission, multiplexing, and splicing to prevent underflow of a decoder buffer of a predetermined size, each frame having a presentation time stamp and a decoding time stamp, said method comprising the steps of:
  a) determining, prior to transmission of a data stream, a potential data underflow for said decoder buffer by a process of emulation when said decoder buffer is less than said predetermined size;
  b) adding a predetermined value to said presentation time stamp when said potential data underflow is determined in step a); and
  c) adding said predetermined value to said decoding time stamp when said potential data underflow is determined in step, a);
  whereby a buffer underflow of said decoder buffer is prevented, wherein said predetermined value added to said presentation time stamp is an amount T determined by the relationship:

$$T=(B-x)/[S*(P-H)/P]$$

where:
  B=the size of said decoder buffer;
  x=the size of said current buffer;
  S=the bit rate of said transport stream;
  P=a uniform size of said packets; and
  H=a minimum header size for each of said packets,
wherein a maximum number of null packets deleted is by the relationship:

$$N=(B-x)/(P-H)$$

where: N=a number of packets.

* * * * *